UNITED STATES PATENT OFFICE.

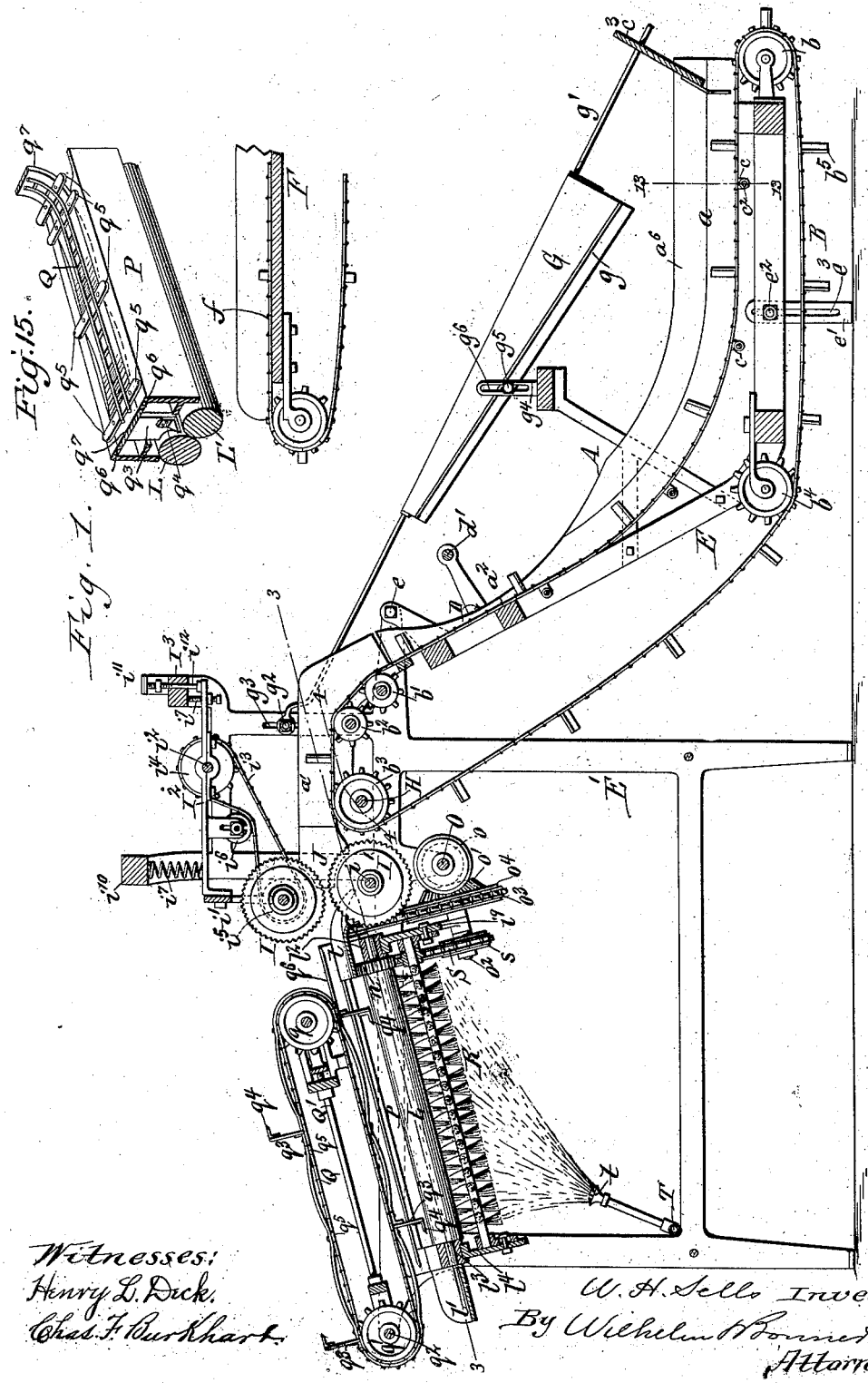

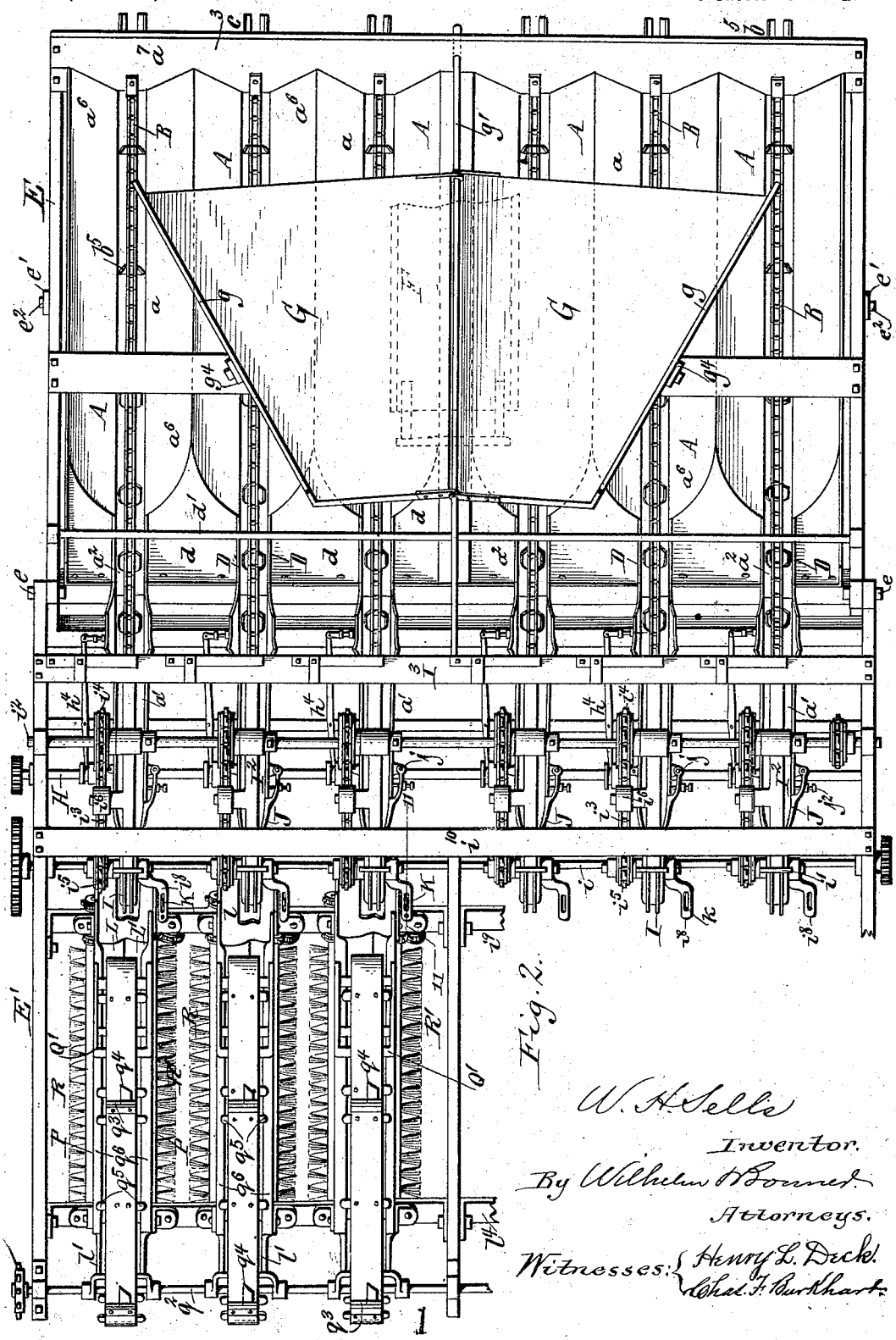

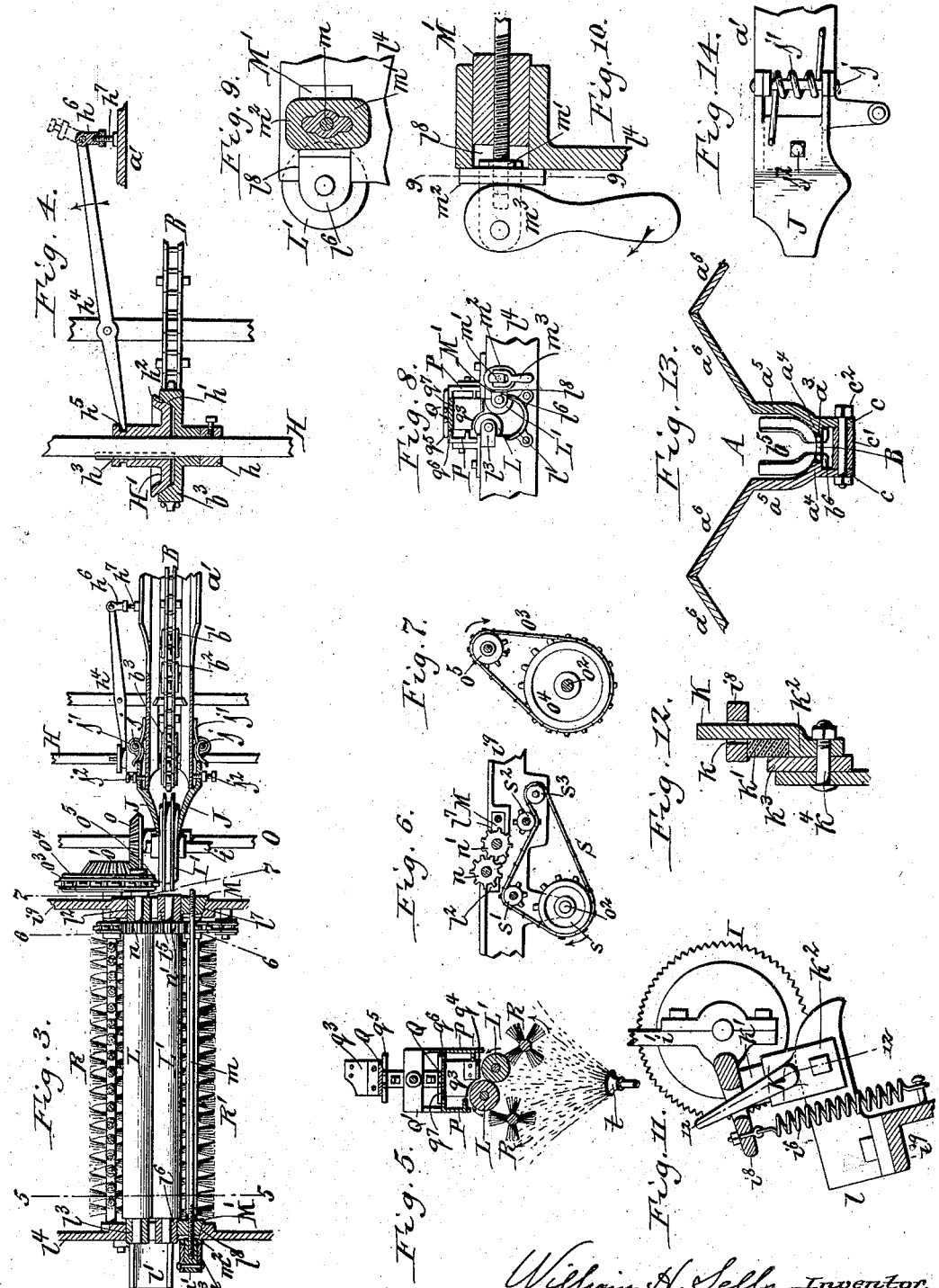

WILLIAM H. SELLS, OF BUFFALO, NEW YORK, ASSIGNOR TO JOHN A. SELLS, OF MONTESANO, WASHINGTON.

CORN-HUSKING MACHINE.

SPECIFICATION forming part of Letters Patent No. 640,961, dated January 9, 1900.

Application filed August 13, 1898. Serial No. 688,527. (No model.)

*To all whom it may concern:*

Be it known that I, WILLIAM H. SELLS, a citizen of the United States, residing at Buffalo, in the county of Erie and State of New York, have invented a new and useful Improvement in Corn-Husking Machines, of which the following is a specification.

This invention relates to a corn-husking machine in which the unhusked ears of corn are thrown indiscriminately into one or more feeding-troughs, from which latter the ears of corn are delivered one at a time to a slitting mechanism which slits the husks lengthwise of the ear, after which the ears of corn are presented to a husking device whereby the husks are removed from the ears. A machine of this kind is shown and described in application for Letters Patent filed by me November 26, 1894, Serial No. 530,019.

The objects of the present invention are to improve the construction of the feeding-trough and to permit of adjusting the same for regulating the separation of the ears of corn, to provide a distributing device whereby the ears of corn are distributed uniformly into a number of feeding-troughs, to provide a frictional driving mechanism for the feed-belt in each trough which will permit the feeding action of each belt to be regulated and to be arrested if the belt becomes clogged, to provide improved guides whereby the ears of corn are directed from the feed mechanism to the slitting mechanism, to provide means whereby the slitting knives or cutters are held in alinement with each other and the upper cutter is cushioned as it approaches the lower cutter, to provide means whereby the husking-rollers may be separated when the machine is not in use, so as to prevent flattening of the elastic surfaces of the roller, to provide means whereby any ears or husks which are caught between the husking-rollers are removed and prevented from clogging the husking-rollers, and to improve the means whereby the husking-rollers are kept clean.

In the accompanying drawings, consisting of three sheets, Figure 1 is a vertical sectional elevation of the machine, taken lengthwise through one of the feeding, slitting, and husking mechanisms. Fig. 2 is a fragmentary top plan view showing a number of feeding, slitting, and husking mechanisms arranged side by side. Fig. 3 is a fragmentary horizontal section in line 3 3, Fig. 1. Fig. 4 is a fragmentary horizontal section, on an enlarged scale, in line 4 4, Fig. 1. Figs. 5, 6, and 7 are fragmentary transverse sections in lines 5 5, 6 6, and 7 7, Fig. 3, respectively. Fig. 8 is a fragmentary sectional end view of one of the husking mechanisms. Fig. 9 is a fragmentary cross-section, on an enlarged scale, of the adjusting device of the delivery end of one of the husking-rollers, the section being taken in line 9 9, Fig. 10. Fig. 10 is a fragmentary longitudinal section of the adjusting device shown in Fig. 9. Fig. 11 is a fragmentary longitudinal section, on an enlarged scale, of the guide and buffer device of the slitting mechanism, the section being taken in line 11 11, Fig. 2. Fig. 12 is a fragmentary transverse section in line 12 12, Fig. 11. Fig. 13 is a fragmentary cross-section, on an enlarged scale, of one of the feed-troughs, taken in line 13 13, Fig. 1. Fig. 14 is a side elevation, on an enlarged scale, showing one of the yielding guides at the delivery end of the feed-trough. Fig. 15 is a sectional perspective view of the guide ways or plates over one pair of husking-rollers and the clearing-belt guided thereon.

Like letters of reference refer to like parts in the several figures.

A represents a number of feeding-troughs which are arranged lengthwise, side by side, and each of which consists of a lower horizontal receiving portion $a$, an upper horizontal delivery portion $a'$, and an intermediate inclined separating portion $a^2$, which extends from the receiving portion of the delivery portion. The receiving portion of the feed-trough consists of two like parts, which are separated by a longitudinal slot $a^3$ in the bottom of the trough, each part comprising a bottom section $a^4$, a side wall $a^5$, extending upward from the bottom section, and an inclined guide-plate $a^6$, connecting with the upper end of the side wall. Each side wall of the trough is formed integrally with the adjacent portion of the bottom and with the guide-plate on the same side of the trough. The upper ends of the guide-plates of adjacent troughs are fitted against each other, so as to form an unbroken surface at this point and cause any corn falling upon this portion to be directed into either one or the other of the feed-troughs.

B represents a feed belt or chain which passes with its receiving end around a sprocket-wheel $b$, arranged at the receiving end of the receiving-trough and passes thence forwardly and lengthwise through the slot in the receiving portion, thence upwardly along the bottom of the inclined separating portion of the trough and over two sprocket-wheels $b'$ $b^2$, thence forwardly and over a delivery sprocket-wheel $b^3$, thence downwardly and backwardly around a sprocket-wheel $b^4$ to the place of beginning, as represented in Fig. 1. The feed-belt is provided at intervals with a pair of upwardly-projecting feeding-wings $b^3$, the front sides of these wings diverging forwardly, so that the ears which fall into the trough in front of the wings are centered between the wings and carried lengthwise through the trough. In order to prevent the feed-belt from being lifted in the receiving section of the feed-trough, the latter is provided at intervals on its under side with laterally-projecting guide ears or lugs $b^6$, which run along under the bottom portions of the trough and hold the belt against rising.

$c$ represents a number of depending coupling-lugs arranged on the bottom portions of the receiving and separating trough portions outside of the path of the guide-lugs of the chain. These lugs are arranged in pairs, and each pair is clamped against opposite ends of a coupling-sleeve $c'$ by means of a transverse bolt $e^2$, as represented in Figs. 1 and 13. By thus connecting the sections of the receiving and separating trough portions the sections are held against displacement with reference to each other, thereby preventing the feed-belt, which passes through the slot between the sections, from being cramped or bound in said slot and insuring easy working of the same. The receiving ends of the receiving portions of the several feed-troughs are provided with an inclined guide board or plate $c^3$.

The side walls of the intermediate inclined separating portion of the feed-trough are depressed or cut down, as shown at Fig. 1, and the outer sides of these depressed portions are connected by inclined returning-plates $d$ with the guide-plates of the adjacent receiving portion of the trough. The height and width of the receiving-trough is such that an ear of corn of normal size can enter the same lengthwise, and when engaged by a pair of the feeding-wings this ear is carried lengthwise through the receiving, separating, and delivery portion of the trough and presented lengthwise, one end foremost, to the slitting mechanism. If any ears are carried forwardly by the wings in an improper position in the trough—for instance, one ear riding on top of the other, two small ears arranged side by side, or a single ear arranged obliquely—these misplaced ears of corn when they arrive at the depressed side walls D of the separating-section escape laterally from the feed-wing owing to the want of side support at this part of the trough and fall upon the inclined returning-plates $d$. The latter carry the ears of corn which have escaped from the feed-belt backwardly to the guide-plates $a^6$ and are directed by the same into the receiving portion of the trough, this operation being the same as in the machine shown in the application for Letters Patent heretofore referred to. Any ears which stick up with the advancing end are engaged by a clearing-bar $d'$, which extends transversely across the depressed portions D of the several troughs and are disengaged from the wings and returned by the returning-plates to the adjacent receiving-trough portion, as in the machine of the application referred to.

The receiving portions of the several feed-troughs, together with the receiving and intermediate sprocket-wheels $b$ $b^4$, are mounted on the front section E of the main frame, while the delivery portions of the several feed-troughs, the intermediate sprocket-wheels $b'$ $b^2$, and the delivery-sprocket $b^4$ are mounted upon the rear section E' of the main frame. The front section of the main frame is pivoted on opposite sides to the rear section at a point adjacent to the upper end of the separating-sections by horizontal pivots $e$, so that the front frame-section can be raised and lowered for adjusting the angle or the separating-sections to suit the requirements for effecting the best separation of the ears of corn. The front frame-section is held in its adjusted position by means of two or more feet $e'$, which are adjustably secured to the front section of the frame by bolts $e^3$, passing through vertical slots $e^2$ in said feet.

F represents a supply trough or chute which is arranged with its delivery end over the receiving portions of the feeding-troughs and which is provided with an endless conveyer belt or chain $f$, whereby the ears of corn which are placed in the supply-trough are delivered into the receiving portions of the troughs.

In order to effect a uniform distribution of the ears of corn into the different receiving portions of the feeding-troughs, a distributing device is provided, which is constructed as follows: G G represent two inclined distributing or deflecting boards or tables which are arranged side by side above the feeding-troughs and which are arranged close together along their inner longitudinal edges. Each of these boards inclines from its rear end toward its front end and from its inner end toward its outer end. The outer end of each board is arranged at an angle, so that the two outer ends of both deflecting-boards diverge forwardly and the two boards together form a deflector which enlarges from its upper or receiving end toward its lower or delivery end. The ears of corn are discharged from the supply-trough centrally upon the upper narrow portion of the deflector and then slide down in opposite directions upon both of the deflecting-boards both laterally and forwardly and are distributed uniformly into the different receiving portions of the several troughs. The ears of corn are prevented from sliding over the outer inclined end of the deflecting-boards by rails or cleats $g$, arranged on these ends of the boards. The uniformity in the distribution of the ears of corn depends upon the inclination of the deflecting-boards, and in order to secure this result the boards are hinged at their inner ends to an inclined longitudinal bar $g'$, so that they can be raised and lowered into the desired angle laterally. The bar $g'$ is also capable of being shifted vertically for changing the longitudinal inclination of the deflecting-boards from their upper ends to their lower ends. For this purpose the bar is loosely supported with its lower end in the front guide-board $c^9$ of the troughs or other support, while its upper end is adjustably secured by a bolt $g^2$, passing through the bar and a vertical slot $g^3$ in the rear section of the main frame or other support. The deflecting-boards are held in their transversely-inclined position after adjustment by means of supporting-feet $g^4$, each of which rests upon a transverse bar of the front frame-section and is adjustably secured to its respective deflecting-board by a bolt $g^5$ passing through a slot $g^6$ in the foot. By mounting the deflecting-boards so that they can be raised and lowered the space above the receiving portions of the feed-troughs can be cleared when access is desired to this portion of the machine for repairing or cleaning the same.

In order to limit or regulate the strain which can be placed upon the feed-belts and to permit each feed-belt to be coupled with and uncoupled from the driving mechanism independent of the other feed-belts, a frictional driving-clutch is provided for each feed-belt, which is constructed as follows: H represents a transverse driving-shaft, which is journaled in bearings upon the rear section of the main frame and upon which the delivery sprocket-wheels $b^3$ of the several feed-belts are loosely mounted. Each of these sprocket-wheels bears with one side against a shoulder or collar $h$, secured to the driving-shaft, and its opposite side is provided with a conical clutch-face $h'$, which is adapted to be engaged by a corresponding conical face $h^2$ of a clutch disk or wheel H, as represented in Fig. 4. The clutch-disk is keyed to the driving-shaft, as shown at $h^3$, so as to be compelled to turn therewith but be free to slide lengthwise thereon. Upon engaging the clutch-disk with the adjacent delivery sprocket-wheel $b^3$ the latter is turned with the driving-shaft, and the respective feed-belt is moved forwardly through the feed-trough for feeding the ears of corn. The clutch-disk is moved into and out of engagement with the driving sprocket-wheel by means of a rock-lever $h^4$, pivoted on the adjacent portion of the rear frame-section, and engaging with its rear arm in an annular groove $h^5$ in the hub of the clutch-disk. The frictional contact between the clutch-disk and driving-wheel is so adjusted that when the belt becomes clogged and the strain upon the same exceeds a predetermined limit the clutch-disk slips upon the driving-wheel, thereby avoiding breaking of the belt or connecting parts. The frictional contact between the clutch-disk and driving sprocket-wheel $b^3$ is adjusted by means of a swivel piece or block $h^6$, which is pivoted to the front arm of the rock-lever $h^4$, and an adjusting-screw $h^7$, which engages with a screw-threaded opening in the swivel-piece and bears with its head against a stationary abutment. This abutment may consist of the adjacent wall of the delivery portion of the feed-trough, as shown in the drawings, or some other stationary part of the machine. When it is desired to operate the feed-belt, the rock-lever is turned in the direction of the arrow, Fig. 4, whereby the clutch-disk is engaged with the driving-wheel, and then the swivel and adjusting-screw are turned until the head of the latter bears against the abutment, whereby the clutch is locked in its coupled position. When it is desired to uncouple the clutch, the swivel-piece and the adjusting-screw mounted thereon are swung out of engagement with the stationary abutment, as shown by dotted lines in Fig. 4, which permits the clutch rock-lever to be shifted in the opposite direction for uncoupling the clutch. By shifting the adjusting-screw in the swivel-piece the throw of the lever and the frictional contact between the clutch-disk and driving-wheel can be regulated.

I I' represent the upper and lower rotary cutters, between which the ears of corn are delivered by the feed mechanism and whereby the husks of the corn are slitted lengthwise. A pair of these cutters is arranged in rear of the delivery end of each feed-trough and their operative portions move in the same direction in which the corn is delivered from the feed-trough, whereby these cutters serve the double purpose of slitting the corn and also propelling the same.

J J represent two guide-plates whereby the ears of corn are guided from the delivery end of the feed-trough to the cutters. These plates are pivoted at their front ends to the outer sides of the adjacent portion of the feed-trough by vertical pivots $j$, and their rear ends converge toward the operative portions of the cutters. These guide-plates are yieldingly held with their rear ends converging close to the cutters by springs $j'$, each of which surrounds the pivot of one of the guide-plates and bears with its ends against the adjacent portions of the guide-plate and the feed-trough. The movement of the guide-plates toward the cutters is limited, so as to prevent these plates from coming in contact with the cutters by means of stops, each of which consists of a screw $j^2$, engaging with a threaded opening in one of the guide-plates and bearing against the adjacent outer side of the feed-trough. As the ear of corn issues from the feed-trough these guide-plates direct the same centrally between the upper and lower cutters, and if the ear of corn is larger in diameter than the space between the rear ends of the guide-plates the latter yield as much as is necessary to permit the ear to pass between the same. When the guide-plates are in their normal position, their rear portions project into the path of the feed-wings on the feed-belt and prevent the escape of ears through the space between the delivery end of the feed-trough and the cutters when the same is not obstructed by a pair of feed-wings. As the feed-wings pass through this space they engage with the guide-plates and deflect the same, and after the feed-wings have cleared the guide-plates the latter are returned to their normal position by their springs $j'$.

The lower rotary cutters of the several slitting mechanisms are mounted upon a transverse shaft $i$, which is journaled in stationary bearings on the rear section of the main frame. Each of the upper cutters is capable of moving vertically toward and from its coöperating lower cutter, so as to adapt the cutters to different sizes of ears of corn. The movable upper cutter is journaled transversely on the depending rear arm $i'$ of a rock-lever $I^2$, which is hung upon a transverse driving-shaft $i^2$. Motion is imparted to the upper cutter from the driving-shaft $i^2$ by means of a chain-belt $i^3$, passing around sprocket-wheels $i^4$ $i^5$, secured, respectively, to the driving-shaft and the shaft of the upper cutter and around a tightening pulley $i^6$, mounted on the upper-cutter-supporting lever. The downward movement of the upper cutter is limited, so as to prevent the same from coming in contact with the lower cutter by means of an adjustable stop consisting of a bolt $i^7$, arranged on the front arm of the cutter-supporting lever and adapted to engage with a cross-bar $I^3$ on the upper portion of the rear frame-section. The upper cutter is yieldingly held in a depressed position by two springs $i^6$ $i^7$. The lower spring $i^6$ is secured with its upper and lower ends to a forwardly-projecting lug $i^8$ on the rear arm of the cutter-supporting lever, and its lower end is secured to a cross-piece $i^9$ of the rear frame-section, as shown in Fig. 11. The upper spring $i^7$ is interposed between the rear arm of the cutter-supporting lever and a cross-bar $i^{10}$ of the rear frame-section. The upper cutter is balanced and assisted during the first portion of its upward movement away from the lower cutter by a spring $i^{11}$, secured to the cross-bar $I^8$ and bearing against the upper end of a presser-rod $i^{12}$, which slides vertically in the cross-bar $I^8$, which rod bears with its lower end against the front arm of the upper-cutter-supporting lever.

K represents an upwardly-projecting guide-arm, which is secured at its lower end to the adjacent portion of the rear frame-section and which engages with its upper end in a longitudinal slot $k$, formed in the lug $i^8$ on the front arm of the cutter-supporting lever, as shown in Figs. 11 and 12. As the upper cutter rises and falls the lug slides up and down on the guide-arm, and the upper cutter is thereby held against lateral displacement with reference to the lower cutter. $k'$ represents an elastic buffer upon which the lug $i^8$ of the cutter-supporting arm is adapted to rest when in its lowered position and which prevents undue jarring of the machine when the upper cutter drops upon leaving the rear end of an ear of corn. This buffer is secured between supporting-plate $k^2$ of the guide-arm and a clamping-plate $k^3$, which parts are clamped together and at the same time secured to the adjacent stationary part of the machine by a bolt $k^4$.

The husking mechanism, to which the ears of corn are delivered by the slitters or cutters and whereby the husks are removed from the ears, is constructed as follows: L L' represent two rearwardly-inclined husking-rollers, which are arranged lengthwise in rear of each set of cutters and which are formed of rubber or other elastic material. These rollers are arranged parallel and one somewhat higher than the other, and when the machine is in operation these rollers bear against each other and are rotated, so that their contiguous portions move downwardly. The unhusked ears of corn are delivered by the slitters upon the receiving or front ends of these rollers, and the latter, while rotating, strip the husks from the ears and discharge them below the husking-rollers, while the stripped or husked ears are discharged rearwardly over the tail or rear ends of the rollers. The ears of corn are preferably guided from the cutters to the receiving ends of the husking-rollers by a trough-shaped guide $l$, which extends across the space between the cutters and rollers, and the husked ears are guided by a spout $l'$ from the rear ends of the husking-rollers upon the floor or into receptacles provided for this purpose. One of the husking-rollers is made adjustable toward and from the other husking-roller, so as to permit of taking up wear and also to permit of separating the rollers when the machine is not in use, so as to avoid flattening of the rollers, which occurs when the rollers bear against each other with considerable pressure when at rest. As shown in the drawings, the upper roller has the ends of its shaft journaled in stationary bearings $l^2 l^3$, which are mounted, respectively, on the cross-piece $i^9$ and a cross-piece $l^4$, arranged on the rear portion of the rear frame-section. The lower husking-roller L' has the front and rear ends of its shaft journaled, respectively, in transversely-movable bearings $l^5 l^6$, which are guided in ways $l^7 l^8$, formed on the cross-pieces $i^9 l^4$.

M M' represent two wedges, which are interposed between the bearings of the lower husking-roller and the inclined backs of the ways in which these bearings move. Upon moving these wedges rearwardly the bearings of the lower husking-roller are moved toward the bearings of the other roller, whereby the rollers are pressed together, and upon moving the wedges forwardly the rollers are free to separate, which separation is effected by the resilience of the rubber husking-rollers aided, if necessary, by hand.

$m$ represents a tie or shifting rod, which connects the wedges and causes them to move backward and forward simultaneously. This tie-rod is connected with the wedges by engaging its screw-threaded front and rear ends with screw-threaded openings in the wedges.

$m'$ represents an adjusting-block, which is provided with a screw-threaded opening, which receives the screw-threaded rear end of the shifting rod.

$m^2$ is a thrust-plate provided with an irregularly-shaped opening, which receives the correspondingly-shaped adjusting-block, so that the plate is compelled to turn with the thrust-block; but the latter is capable of sliding lengthwise through the plate. The latter when in its normal position bears against the rear side of the cross-piece $l^4$ above and below the guideway $l^3$, as shown in Figs. 9 and 10.

$m^3$ is a bifurcated cam-lever pivoted to opposite sides of the adjusting-block by a transverse pivot and adapted to bear against the rear side of the thrust-plate $m^2$. Upon turning the cam-lever so that its salient portion bears against the thrust-plate, as shown in Fig. 10, both wedges are drawn rearwardly and the lower husking-roller is pressed against the upper husking-roller. Upon turning the cam-lever in the direction of the arrow, Fig. 10, until the receding portion of the cam-lever faces the thrust-plate the wedges can be moved forwardly, so as to allow the lower roller to move away from the upper roller. Upon turning the adjusting-block upon the shifting rod the screw-threaded connection between the same causes the wedges to be moved toward or from the cam, thereby permitting of adjusting the wedges for securing the desired pressure between the husking-rollers. The turning of the adjusting-blocks is effected while the cam-lever is loose, and during this turning movement the cam-lever and the thrust-plate move with the adjusting-block, whereby these parts are always retained in their proper relative position.

The husking-rollers are caused to turn in unison by intermeshing gear-wheels $n$ $n'$, which are secured to the front ends of the upper and lower shafts, respectively, and which are arranged below the front guide-plate $l$, so as to prevent the ears of corn from coming in contact with the same.

O represents the main driving-shaft, arranged transversely below the cutters and journaled in bearings on the rear frame-section. Motion is transmitted from this shaft to the husking-rollers by means of intermeshing bevel gear-wheels $o$ $o'$, secured, respectively, to the main shaft and to the front end of a short longitudinal shaft $o^2$, journaled in the cross-piece $i^9$ and a chain belt $o^3$, passing around sprocket-wheels $o^4$ $o^5$, connected with the bevel gear-wheel $o'$ and the front end of the upper roller-shaft $o^2$, respectively, as represented in Figs. 1, 3, and 7.

P P represent two vertical side walls or plates, which are arranged lengthwise adjacent to the upper outer portions of the husking-rollers and which confine the ears of corn upon the rollers while the husks are being removed therefrom, these plates being secured at their front and rear ends to the front and rear cross-pieces $i^9$ $l^4$.

In order to compel the ears of corn to travel from the front to the rear ends of the husking-rollers and to prevent the same from clogging the rollers, a clearing device is provided, which is constructed as follows: Q represents a number of clearing-belts, one of which is arranged lengthwise above each pair of husking-rollers and which passes around front and rear sprocket-wheels $q$ $q'$, arranged adjacent to the front and rear ends of the husking-rollers. The rear sprocket-wheels of the several clearing-belts are mounted upon a transverse driving-shaft $q^2$, which is journaled in bearings on the rear portion of the rear frame-section. Each of the front sprocket-wheels $q$ is journaled transversely in bearings mounted on the front end of a frame Q', which is hung with its rear end on the driving-shaft supporting the rear sprocket-wheels $q'$. $q^3$ represents a number of clearing or feeding wings which are secured at intervals to the outer side of the clearing-belt and which are carried by the latter rearwardly over the husking-rollers and between the side walls thereof, whereby the ears of corn are forcibly carried lengthwise over the husking-rollers, this operation being the same as in the machine in the application for patent heretofore referred to. Each of the feeding or clearing wings is provided at its outer end with a cutter or knife-blade $q^4$, which is adapted to move lengthwise through the longitudinal channel or groove formed between the upper portion of the husking-rollers. If any ears of corn or husks become caught between the rollers, those portions of the ears and husks projecting above the rollers are cut off by the blades on the clearing-wings and carried rearwardly over the tail of the husking-rollers, thereby preventing these rollers from becoming clogged. $q^5$ represents laterally-projecting guide-ears, which are formed on opposite sides of the clearing-belt adjacent to the clearing-wings and also at intermediate points and which slide over the top of inwardly-projecting flanges or rails $q^6$, formed on the upper ends of the side walls P P, as the clearing-belt moves with its lower or carrying portion over the husking-rollers. These guide-ears and supporting-rails hold the feed-wings out of contact with the husking-rollers and prevent the knives at the lower ends thereof from digging into the rollers and injuring the same, which would be liable to happen if the wings were free in traveling over the husking-rollers. $q^7$ represents a flexible covering or band which is secured to the outer side of the clearing-belt, so as to cover the links of the latter and also close the space between the upper ends of the side walls of the husking-rollers as the belt passes over the same, thereby preventing the ears of corn from escaping over the top of the side walls or becoming caught in the links of the clearing-belt.

R R', Figs. 1, 2, 3, and 5, represent two rotary cleaning-brushes, which are arranged lengthwise below the husking-rollers and rotate, respectively, in contact with these rollers, whereby any particles of corn, husks, and silks are removed from the husking-rollers. These brushes are journaled at their ends in bearings secured to the front and rear cross-pieces $i^9 l^4$ and are preferably turned, so that each roller and its coöperating brush rotate with their contact-surfaces in opposite directions, whereby a wiping action of the brush upon the roller is produced. These rollers are rotated by means of a chain belt S, passing around sprocket-wheels $s\ s'\ s^2$, secured, respectively, to the rear end of the short shaft $o^2$ and the front ends of the brush-shafts and around an idle roller $s^3$, pivoted on the front cross-piece $i^9$, as shown in Figs. 1, 3, and 6.

If desired, the coöperating sides of each husking-roller and the opposing brush may be rotated in the same direction, in which case the roller and brush must be rotated at a differential speed in order to secure a wiping action of the brush.

In order to assist in clearing the husking-rollers and brushes from any husks, silks, or corn-juice which reduce their efficiency, a spray of water is delivered against the under sides of rollers and brushes, which washes this material from the rollers and brushes, and thereby keeps them in the most effective condition. For this purpose a water-supply pipe T is arranged on the lower portion of the rear frame-section and provided with an upwardly-projecting spraying-nozzle $t$ underneath each pair of rollers and brushes, as shown in Figs. 1 and 5, whereby a fine spray of water is directed against the under sides of the rollers and brushes.

I claim as my invention—

1. The combination with the two longitudinal sides of a feed-trough which are separated by an intervening longitudinal slot and the feed-belt passing lengthwise through said slot, of coupling-lugs arranged on the sides of the trough adjacent to the slot between the same, a sleeve arranged between each lug on one side and a lug on the other side, and a bolt connecting said sleeve with the adjacent lugs, substantially as set forth.

2. The combination with a number of feed-troughs arranged side by side, of two laterally-inclined distributing-boards arranged side by side above the feed-troughs and pivoted at their adjacent inner longitudinal edges, and adjusting devices connected with said boards and whereby the lateral inclination of the boards may be adjusted, substantially as set forth.

3. The combination with a number of feed-troughs arranged side by side, of two longitudinally and laterally inclined distributing-boards arranged side by side above the feed-troughs, adjusting mechanism for varying the longitudinal inclination of the boards, and adjusting mechanism for varying the lateral inclination of the boards, substantially as set forth.

4. The combination with a number of feed-troughs arranged side by side, of two longitudinally and laterally inclined distributing-boards arranged side by side over the feed-troughs, a longitudinal supporting-rod to which the inner edges of the boards are pivoted and which is capable of vertical adjustment for varying the longitudinal inclination of the boards, and supports which are adjustably connected with the boards and whereby the boards may be raised or lowered for varying the lateral inclination thereof, substantially as set forth.

5. The combination with the feed-trough and the feed-belt moving lengthwise through the same, of a driving-shaft, a driving-wheel mounted loosely in said shaft and propelling said belt, a driving-disk keyed to said shaft so that it is compelled to turn therewith but is capable of sliding lengthwise thereon, toward and from the driving-wheel, a rock-lever connected loosely with one arm to said driving-disk, a swivel-block pivoted to the other arm of the rock-lever, and an adjusting-screw arranged in said block and adapted to engage with a stationary abutment, substantially as set forth.

6. The combination with the feed-trough, the feed-belt arranged in said trough and passing around a wheel at the delivery end of the trough, the feed-wings arranged on the belt, and the rotary cutters arranged in rear of the feed-trough, of two laterally-movable guide-plates which are arranged on opposite sides of the space between the rear end of the feed-trough and the cutters and which project normally into the path of the wings, and springs whereby the guide-plates are yieldingly held in their normal position, substantially as set forth.

7. The combination with the lower rotary cutter, the upper rotary cutter capable of moving vertically toward and from the lower cutter and the rock-arm carrying the upper cutter, of a vertical guide whereby the rock-arm is held against lateral displacement and the upper cutter is held in alinement with the lower cutter, substantially as set forth.

8. The combination with the lower rotary cutter, the upper rotary cutter capable of moving vertically toward and from the lower cutter and the rock-arm supporting the upper cutter, of an upright guide-arm engaging with a slotted lug on the rock-arm, and an elastic buffer which is arranged adjacent to the guide-arm and adapted to be engaged by the slotted lug, substantially as set forth.

9. The combination with the husking-rollers arranged lengthwise side by side, of stationary bearings in which one of the rollers is journaled, transversely-movable bearings in which the other roller is journaled and which is guided in transverse ways in the frame, wedges arranged in said ways and engaging with the movable bearings, a rod connecting said wedges, an adjusting-block having a screw connection with said rod, a thrust-plate mounted on said block and bearing against the frame, and a cam pivoted on the adjusting-block and bearing against the thrust-plate, substantially as set forth.

10. The combination with a pair of husking-rollers arranged lengthwise side by side, and a trough or guideway arranged above said rollers, of a clearing-belt having its operative portion moving lengthwise over said rollers and provided with wings whereby the ears are moved along the rollers, cutters arranged on the wings and adapted to cut off any ears which become caught between the husking-rollers, and supporting-lugs arranged on the clearing-belt adjacent to its wings and moving along said trough or guideway, whereby the cutters are prevented from being drawn between the rollers and injuring the latter, substantially as set forth.

11. The combination with the husking-rollers arranged lengthwise side by side, of side walls arranged lengthwise of the rollers, a clearing-belt provided with wings moving lengthwise over the rollers, and a covering secured to said belt and adapted to close the space between the side walls as the belt passes over the husking-rollers, substantially as set forth.

Witness my hand this 9th day of August, 1898.

WILLIAM H. SELLS.

Witnesses:
P. W. GRUBBS,
B. W. CULVER.